US009108117B2

(12) United States Patent
Rinehart

(10) Patent No.: US 9,108,117 B2
(45) Date of Patent: Aug. 18, 2015

(54) MULTI-FUNCTIONAL MOUNT

(71) Applicant: John R. Rinehart, Milton, WI (US)

(72) Inventor: John R. Rinehart, Milton, WI (US)

(*) Notice: Subject to any disclaimer, the term of this patent is extended or adjusted under 35 U.S.C. 154(b) by 0 days.

(21) Appl. No.: 14/315,802

(22) Filed: Jun. 26, 2014

(65) Prior Publication Data

US 2014/0308874 A1    Oct. 16, 2014

Related U.S. Application Data

(63) Continuation-in-part of application No. 13/612,234, filed on Sep. 12, 2012, now Pat. No. 8,795,024.

(51) Int. Cl.
*A63H 3/50* (2006.01)
*B32B 3/06* (2006.01)
*B44C 5/00* (2006.01)

(52) U.S. Cl.
CPC .. *A63H 3/50* (2013.01); *B32B 3/06* (2013.01); *B44C 5/00* (2013.01); *Y10T 29/53461* (2015.01)

(58) Field of Classification Search
USPC ............ 446/71, 72, 139, 268, 321, 325, 331; 248/519, 524; 434/295, 296
See application file for complete search history.

(56) References Cited

U.S. PATENT DOCUMENTS

| | | |
|---|---|---|
| 2,454,095 A | 11/1948 | Sandlovich |
| 3,009,284 A | 11/1961 | Ryan |
| 3,801,055 A | 4/1974 | Stenger |
| 4,942,845 A | 7/1990 | Lane |
| 5,378,187 A | 1/1995 | Forbes et al. |
| 5,445,317 A | 8/1995 | Sokolowski |
| 5,810,318 A | 9/1998 | Federico |
| 6,179,685 B1 | 1/2001 | Toft |
| 6,513,284 B1 | 2/2003 | Sandlin |
| 6,659,463 B2 | 12/2003 | Mackey |
| 6,824,113 B1 | 11/2004 | Gee et al. |
| D620,225 S | 7/2010 | Dinh |
| 2007/0087651 A1 | 4/2007 | Ali |
| 2008/0257947 A1 | 10/2008 | Guo et al. |
| 2011/0312242 A1 | 12/2011 | Muller et al. |

OTHER PUBLICATIONS

Notice of Allowance received in U.S. Appl. No. 13/612,234 mailed Mar. 25, 2014, 9 pages.
The Mailbox Works webpage, http://www.mailboxworks.com/residential-mailboxes/novelty.html, printed Jan. 3, 2012.

*Primary Examiner* — Kurt Fernstrom
(74) *Attorney, Agent, or Firm* — Foley & Lardner LLP

(57) ABSTRACT

An article of manufacture includes a figurine body and a first mounting pad at a bottom of the figurine body. The first mounting pad can include a first mounting mechanism. The article of manufacture can also include a raised portion at the bottom of the figurine body. The raised portion is at least in part be adjacent to the first mounting pad. The raised portion is raised in relation to the first mounting pad. The raised portion is configured to prevent a portion of a fastener from rotating 360 degrees.

20 Claims, 12 Drawing Sheets

MULTI-FUNCTIONAL MOUNT

CROSS-REFERENCE TO RELATED APPLICATIONS

The present application is a continuation-in-part of U.S. non-Provisional application Ser. No. 13/612,234 filed on Sep. 12, 2012, the entire disclosure of which is incorporated herein by reference.

BACKGROUND

The present invention relates generally to the field of object mounts, and more particularly to the field of figurine mounts.

Many people enjoy having figurines placed in their yards, such as birds, fish, wild animals, domestic animals, decorations, symbols, sporting memorabilia, etc. For example, in some areas it is popular to have a realistic deer or bird figurine in one's yard to simulate living in the midst of wildlife. In addition, it is common to place decoys, such as owls or hawks, in and around barns and warehouses to deter certain birds, mice and other pests from entering the building.

SUMMARY

In one embodiment, an article of manufacture can include a figurine body and a first mounting pad at a bottom of the figurine body. The first mounting pad can include a first mounting mechanism. The article of manufacture can also include a raised portion at the bottom of the figurine body. The raised portion can at least in part be adjacent to the first mounting pad. The raised portion can be raised in relation to the first mounting pad. The raised portion is configured to prevent a portion of a first fastener from rotating 360 degrees.

In another embodiment, an assembly can include a figurine mounted to a mailbox. The figurine can include a figurine body, a first mounting pad at a bottom of the figurine body. The first mounting pad can include a first mounting mechanism. The assembly can also include a raised portion at the bottom of the figurine body. The raised portion can at least in part be adjacent to the first mounting pad. The raised portion can be raised in relation to the first mounting pad. The raised portion is configured to prevent a portion of a first fastener from rotating 360 degrees.

In another embodiment, a method can include forming a figurine body. The method can also include forming a first mounting pad on the figurine body. The first mounting pad can include a first mounting mechanism. The method can also include forming a raised portion at the bottom of the figurine body. The raised portion can at least in part be adjacent to the first mounting pad. The raised portion can be raised in relation to the first mounting pad. The raised portion is configured to prevent a portion of a first fastener from rotating 360 degrees.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4A is a detail view of the mating area between the figurine and mailbox.

FIG. 10A is a detailed view of the mating area between the figurine with a raised portion in the base and the mailbox in accordance with an illustrative embodiment.

DETAILED DESCRIPTION

Figure 1:
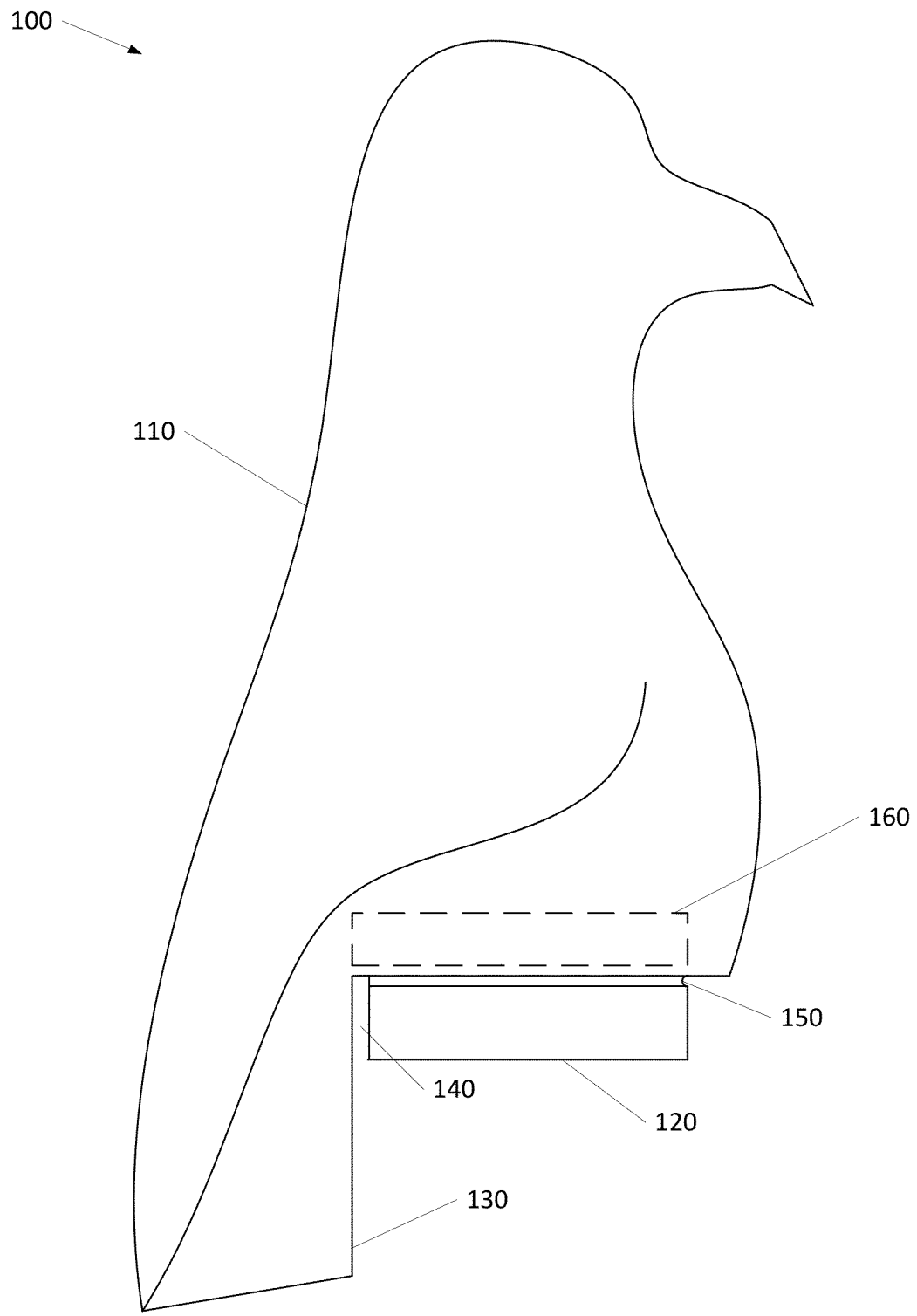
FIG. 1 is a side view of a figurine in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a figurine mount and method of mounting the same. Referring to FIG. 1, a side view of a figurine 100 in accordance with an illustrative embodiment is shown. The figurine 100 can include a figurine body 110, a first mounting pad 120, a second mounting pad 130, a guide groove 150, and a fastening area 160. The figurine body 110 can be any shape or form. FIG. 1 depicts the form of an eagle; however, any animal, shape, symbol, or form could be used. In particular, FIG. 1 depicts a side view of an eagle. In other embodiments, the figurine body 110 can be, for example, a crane, an owl, or a hawk shape. In other embodiments, the shape or form could be a holiday decoration, a football helmet, a baseball, a basketball, etc.

The figurine 100 can be made of plastic, reinforced plastic, fiberglass, composite, cementous material, metal, or any other material. The figurine 100 can be manufactured using various techniques such as injection molding, blow molding, stamping or casting. The figurine 100 can be monolithic or made of multiple pieces. For example, the first mounting pad 120 can be a separate piece.

In one embodiment, the first mounting pad 120 can be a rectangular box shape. The first mounting pad 120 can be a mounting mechanism. The first mounting pad 120 can be hollow, as described further below. The inside base dimensions of the hollow of the first mounting pad 120 can be about the size of a post. For example, the inside base dimensions can be about 4 inches by 4 inches. The inside base dimensions can be other common post dimensions, common pipe dimensions, or any other dimensions. In one embodiment, the bottom of the first mounting pad 120 can be configured to attach to a flat surface. In one embodiment, the first mounting pad 120 can be used to secure the figurine 100 to an object, such as a mailbox.

The first mounting pad 120 can include a notch 140. The notch 140 can extend into the hollow of the first mounting pad 120. In one embodiment, the notch 140 does not extend through a side of the first mounting pad 120. Alternatively, the notch 140 may extend through the side of the first mounting pad 120. The notch 140 can be configured to receive a portion of another object to which the figurine 100 can be attached. In one embodiment, the notch 140 can be configured to receive the top, back end (or lip) of a mailbox. In another embodiment, the notch 140 can be configured to simultaneously adapt to multiple objects. For example, the notch 140, which can be a single notch, can be configured to adapt to a mailbox or a newspaper box. In another embodiment, the notch 140 can be configured to adapt to a protrusion from a mounting surface. In one embodiment, the first mounting pad 120 can be located at or under the bottom of the figurine body 110. For example, the first mounting pad 120 can be located at the feet of a perched bird, as depicted in FIG. 1.

The first mounting pad 120 can be separated from the figurine body 110 by a guide groove 150. The guide groove 150 can be a shallow groove around at least part of the first mounting pad 120. In one embodiment, the guide groove 150 can extend around three sides of the first mounting pad 120. In an illustrative embodiment, the notch 140 extends up to the guide groove 150 as illustrated in FIG. 1. The guide groove 150 can be configured such that a person can easily remove the first mounting pad 120 from the figurine body 110. For example, the guide groove 150 can be thinner in depth than surrounding areas of the first mounting pad 120 and the figurine body 110. Hence, starting at a front of the mounting pad 120, an individual can cut through the guide groove 150 until the individual reaches the notch 140, thereby separating the first mounting pad 120 from the figurine body 110. In addition, the guide groove 150 can provide a track for the person to cut through, thereby improving the accuracy of the cut. In an illustrative embodiment, the notch 140 can be formed such that the notch 140 meets the guide groove 150 on the sides of the first mounting pad 120 and is adjacent to the rear of the first mounting pad 120. As such, when a person cuts through the guide groove 150 formed on the front and sides of the first mounting pad 120, the first mounting pad 120 can break away from the figurine body 110 (e.g., because the entire rear side of the first mounting pad 120 is adjacent to the notch 140).

The second mounting pad 130 can be integrated into the figurine body 110. The second mounting pad 130 can be configured to enhance the stability of a mounted figurine 100. The second mounting pad 130 can be a mounting mechanism. The location of the second mounting pad 130 can be chosen such that the figurine body 110 maintains a natural appearance. In one embodiment, the second mounting pad 130 can be substantially orthogonal (e.g., perpendicular) to the first mounting pad 120. Substantially orthogonal can mean plus or minus 10 degrees from orthogonal. In one embodiment, the second mounting pad 130 can be a flat area located 1 inch to 7 inches away from the first mounting pad 120. The second mounting pad 130 can be configured to adapt to a post. In another embodiment, the second mounting pad 130 can be configured to simultaneously adapt to multiple objects. For example, second mounting pad 130 can be configured to adapt to a post or pole. In one embodiment, the second mounting pad 130 can be located on an appendage of the figurine body 110. For example, the second mounting pad 130 can be located at the tail of a perched bird, as depicted in FIG. 1. In one embodiment, the second mounting pad 130 can be used to secure the figurine 100 to an object, such as the rear of a mailbox.

The fastening area 160 can be configured to provide an attachment between a mounting object, such as a post, and the figurine body 110. The inside of the figurine body 110 and the fastening area 160 can be a mounting mechanism. In one embodiment, when the first mounting pad 120 is removed and a post is inserted into the base of the figurine body 110, the fastening area 160 can lie tight against the post. A person can fasten the figurine body 110 to the post, for example, using fasteners through the fastening area 160 or adhesive between the fastening area 160 and the post. In another embodiment, the fastening area 160 can be configured to lie tight against a pole or any other mounting object. In another embodiment, the fastening area 160 can be located at the front, back or any other area of the figurine body 110.

Figure 2:
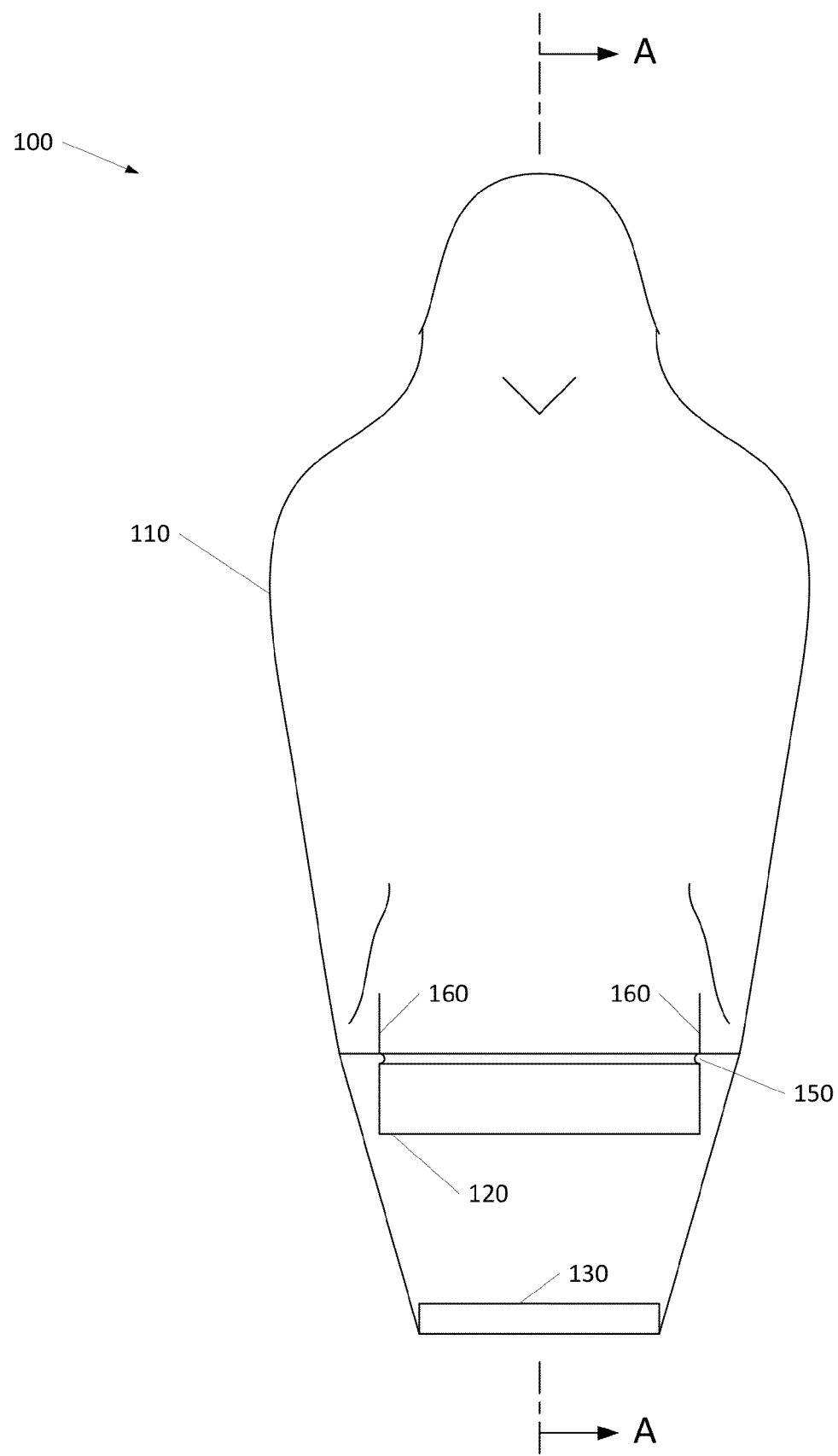
FIG. 2 is a front view of the figurine of FIG. 1 in accordance with an illustrative embodiment.

Referring to FIG. 2, a front view of the figurine 100 of FIG. 1 in accordance with an illustrative embodiment is shown. As described above, the figurine 100 can include the figurine body 110, the first mounting pad 120, the second mounting pad 130, the notch 140 (not visible in FIG. 2), the guide groove 150, and the fastening area 160. The figurine body 110 can be any shape or form. FIG. 2 depicts the form of an eagle; however, any animal, shape, or form could be used.

In one embodiment, the first mounting pad 120 can be a rectangular box shape. The notch 140 of the first mounting pad 120 can extend into the hollow of the first mounting pad 120 as described with reference to FIG. 1. The notch 140 can be configured to adapt to the shape of another object to which the figurine 100 can be attached. In one embodiment, the notch 140 can be configured to adapt to the top, back end of a mailbox. As depicted in FIG. 2, the first mounting pad 120 can be located at the feet of a perched bird.

The guide groove 150 can be a shallow groove around at least part of the first mounting pad 120. In one embodiment, the guide groove 150 can extend around three sides of the first mounting pad 120. FIG. 2 depicts the guide groove 150 extending along the front side of the first mounting pad 120 and continuing to the right and left sides of the first mounting pad 120.

The second mounting pad 130 can be integrated into the figurine body 110. The second mounting pad 130 can be substantially rectangular; however, the second mounting pad 130 can be any shape. As depicted in FIG. 2, the second mounting pad 130 can be a flat surface located at the tail of a perched bird.

The fastening area 160 can be configured to provide an attachment between a mounting object, such as a post, and the figurine body 110. In one embodiment, when the first mounting pad 120 is removed and a post is inserted into the base of the figurine body 110, the fastening area 160 can lie tight against the post. The fastening area 160 can generally be disposed in a vertical fashion depending on the shape of the figurine body 110. As depicted in FIG. 2, the fastening area 160 can be located on a right and left side of the figurine body 110. Hence, when a post is inserted into the base of the figurine body 110, the figurine body 110 can be fastened to the post using the fastening area 160 on both the left and right sides of the figurine body 110.

Figure 3:
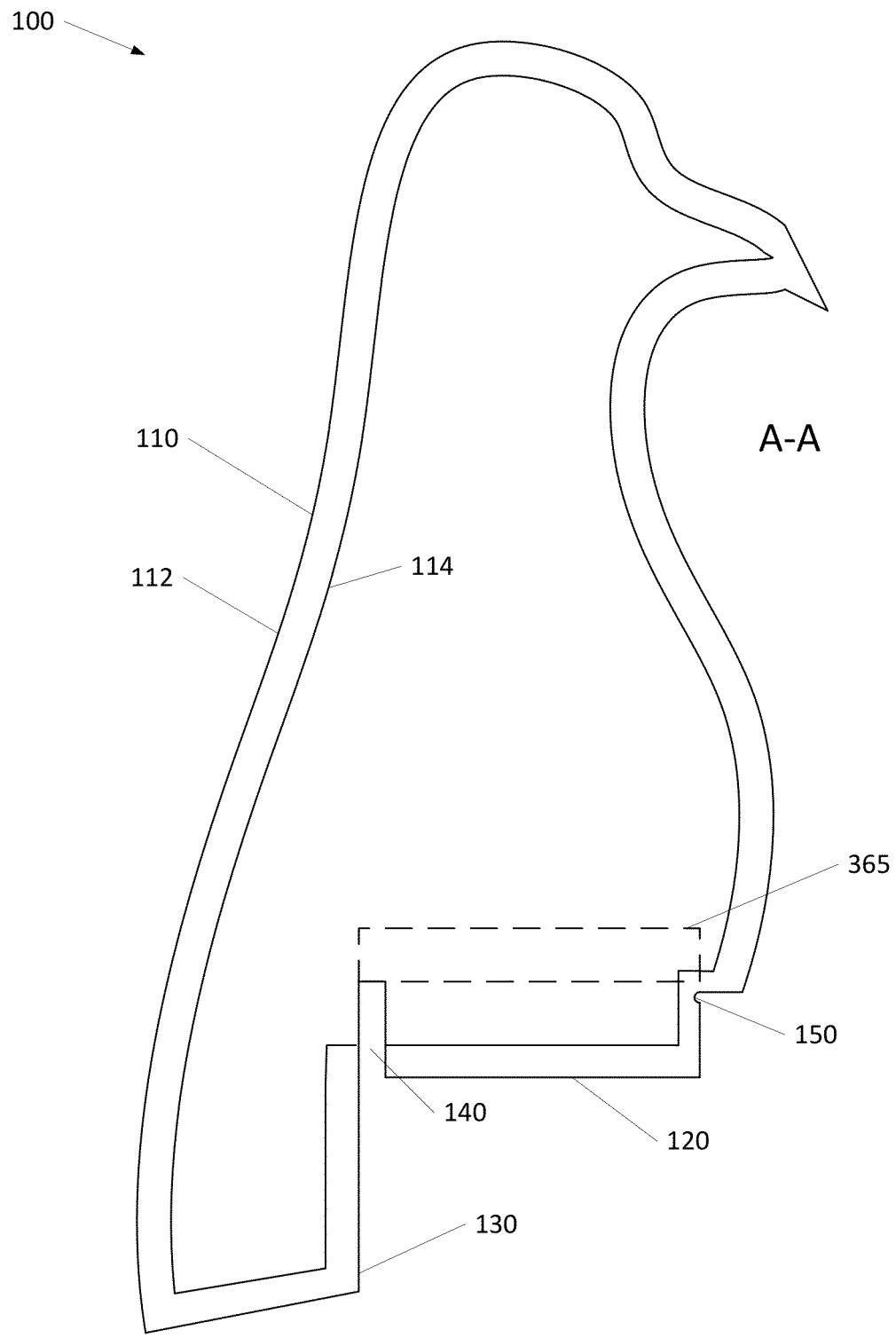
FIG. 3 is a section view of the figurine of FIG. 1 in accordance with an illustrative embodiment.

Referring to FIG. 3, a section view of the figurine 100 of FIG. 1 in accordance with an illustrative embodiment is shown. As described above, the figurine 100 can include the figurine body 110, the first mounting pad 120, the second mounting pad 130, the notch 140, the guide groove 150, and the fastening area 160. The figurine body 110 can be any shape or form. FIG. 3 depicts the form of an eagle; however, any animal, shape, or form could be used.

FIG. 3 depicts an outside surface 112 and an inside surface 114 of the figurine 100. As noted above, the figurine 100 can be made of plastic, reinforced plastic, fiberglass, composite, cementous material, metal, or any other material. The figurine 100 can be monolithic or made of multiple pieces. FIG. 3 depicts a monolithic figurine 100. The thickness between the outside surface 112 and the inside surface 114 can be any thickness. In one embodiment, the thickness between the outside surface 112 and the inside surface 114 can be in a range between about 0.01 inches to 0.5 inches; however, the thickness can be any thickness.

In addition, the thickness between the outside surface 112 and the inside surface 114 can vary. For example, the thickness between the guide groove 150 and the inside surface 114 can be less than an overall thickness between the outside surface 112 and the inside surface 114, in order to ease removal of the first mounting pad 120.

The inside surface 114 can include an inside fastening area 365. The inside fastening area 365 can be configured to provide an attachment surface between a mounting object, such as a post, and the figurine body 110. In one embodiment, when the first mounting pad 120 is removed and a post is inserted into the base of the figurine body 110, the inside fastening area 365 can lie tight against the post. A person can fasten the figurine body 110 to the post, for example, using fasteners through the inside fastening area 365 or adhesive between the inside fastening area 365 and the post. In another embodiment, the inside fastening area 365 can be configured to lie tight against a pole or any other mounting object. In another embodiment, the inside fastening area 365 can be located at the front, back or any other area of the figurine body 110.

The guide groove 150 can be a shallow groove around at least part of the first mounting pad 120. In one embodiment, the guide groove 150 can extend around three sides of the first mounting pad 120, and two sides of the guide groove 150 can meet with the notch 140. FIG. 3 depicts a cross-section of the guide groove 150 at the front of the first mounting pad 120 (the two sides of the guide groove 150 that meet with the notch 140 are not visible in the cross section view).

The second mounting pad 130 can be integrated into the figurine body 110. As depicted in FIG. 3, a mounting surface of the second mounting pad 130 can be substantially vertical.

Advantageously, the figurine 100 can be easily configured to adapt to multiple mounting situations. Advantageously, the first mounting pad 120 can be separated from the figurine body 110 by cutting through guide groove 150 up to the notch 140, so that a post can be inserted into figurine 100. Advantageously, the fastening area 365 can be used to secure the figurine body 110 to the post. Advantageously, the first mounting pad 120 and the second mounting pad 130 can be used to mount the figurine 100 to an object.

Figure 4:
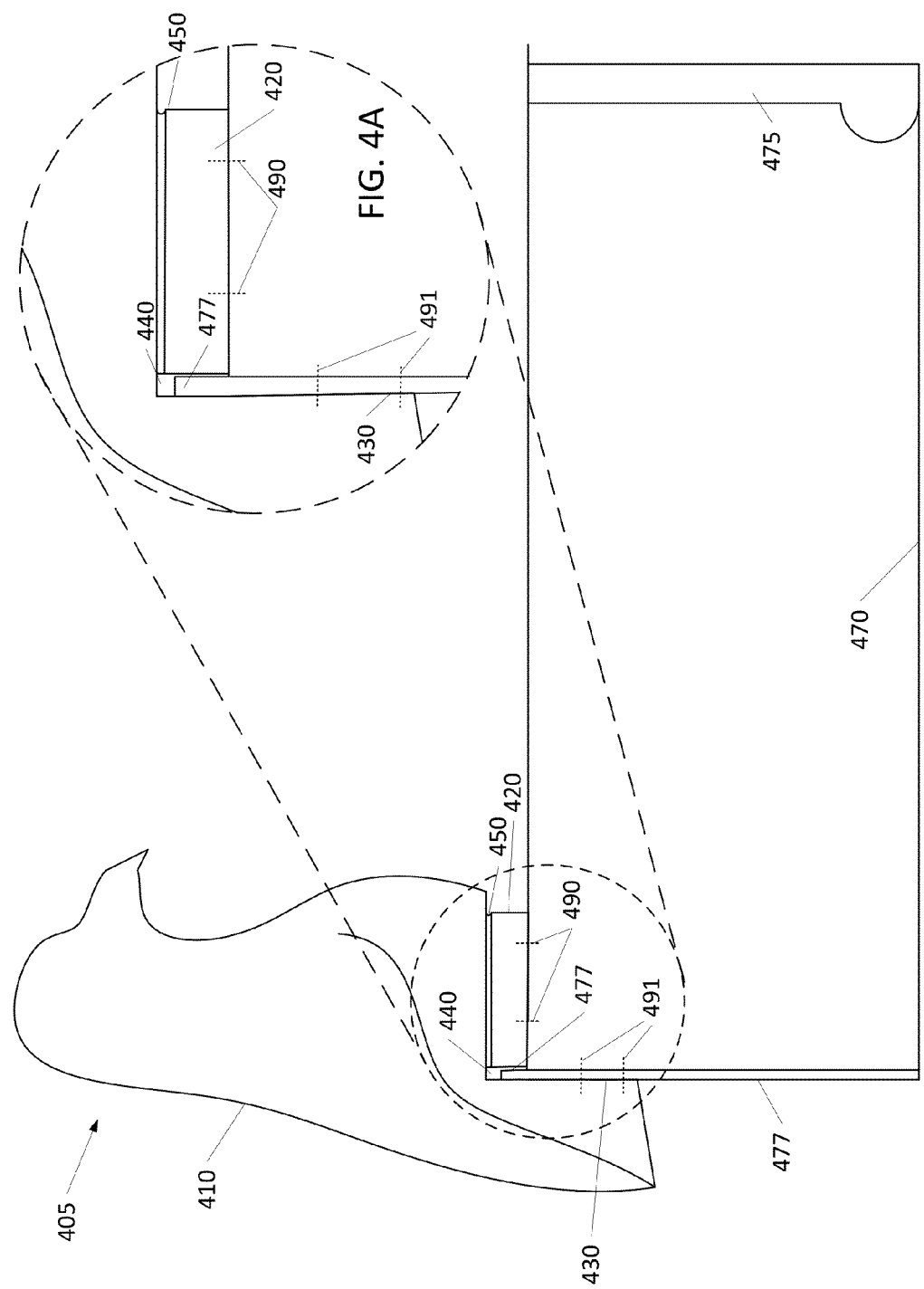
FIG. 4 is a side view of a figurine mounted on a mailbox in accordance with an illustrative embodiment.

Referring to FIG. 4, a side view of a figurine 405 mounted on a mailbox 470 in accordance with an illustrative embodiment is shown. FIG. 4A shows a detail view of the mating area between the figurine 405 and mailbox 470, using the same element numbers. As described above, the figurine 405 can include a figurine body 410, a first mounting pad 420, a second mounting pad 430, a notch 440, and a guide groove 450. In FIG. 4, the first mounting pad 420 remains attached to the figurine body 410. The figurine 405 can sit on the top of the mailbox 470, such that the first mounting pad 420 is located on the top of the back of the mailbox 470 and the second mounting pad 430 is located against the back of the mailbox 470.

The mailbox 470 can be a standard mailbox with an arched top. The mailbox 470 can include a door 475 and a lip 477. The lip 477 can be the seam where the top of the mailbox 470 and the back of the mailbox 470 are seamed together. For example, in a steel mailbox, a seaming machine will roll and press the top and back of the mailbox together. The lip 477 can extend beyond the body of the mailbox 470. Alternatively, the lip 477 can be an aesthetic detail added to the mailbox 470.

The notch 440 can be configured to receive the lip 477 to sit in so that the first mounting pad 420 can sit flush on the top of the mailbox 470. Thus, in one embodiment, the notch 440 is shaped large enough to allow for the top portion of the lip 477. Further, the notch 440 can enable the second mounting pad 130 to contact the back of the mailbox 470.

The figurine 405 can be attached to the mailbox 470 using fasteners. For example, one or more fasteners 490 can be placed through the inside of the mailbox 470 into the first mounting pad 420. In addition, one or more fasteners 491 can be placed through the inside of the mailbox 470 into the second mounting pad 430. The fasteners 490, 491 can be screws, rivets, or any other fastener. Alternatively, the figurine 405 can be attached to the mailbox 470 using adhesive.

Advantageously, the figurine 405 can be easily configured to adapt to multiple mounting situations. Advantageously, the first mounting pad 420 and the second mounting pad 430 can be used to mount the figurine 405 to the mailbox 470.

Figure 5:
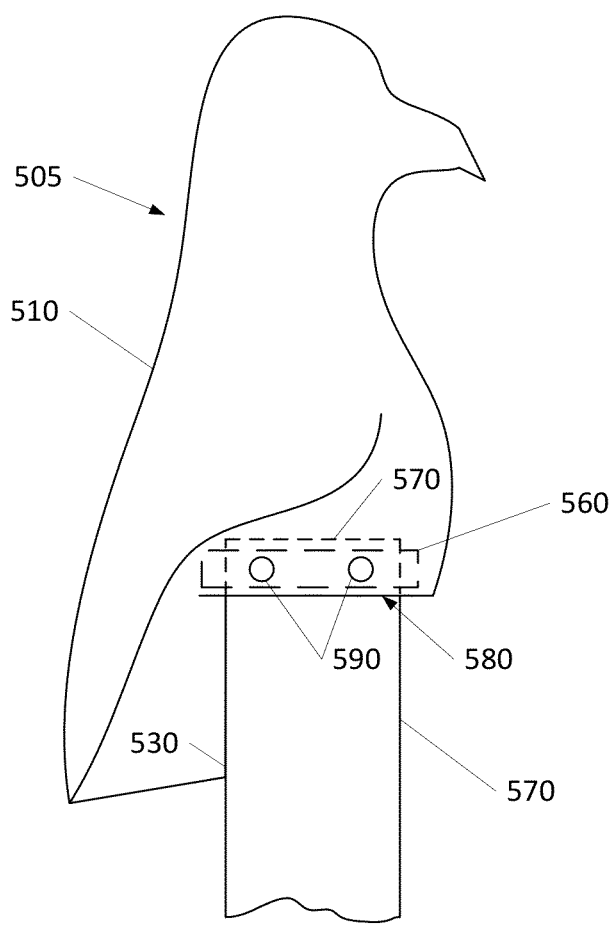
FIG. 5 is a side view of a figurine mounted on a post in accordance with an illustrative embodiment.

Referring to FIG. 5, a side view of a figurine 505 mounted on a post 570 in accordance with an illustrative embodiment is shown. As described above, the figurine 505 can include a figurine body 510, a second mounting pad 530, and a fastening area 560. Notably, in FIG. 5, the first mounting pad has been removed from the figurine body 510 as described above. In FIG. 5, the first mounting pad was cut from the figurine body 510 at the guide groove to the notch, thereby creating an opening 580 at the bottom of the figurine body 510. In at least one dimension, the opening 580 is about the same size as a cross-section of the post 570. In one embodiment, the cross-section of the post 570 can be about 4 inches by 4 inches, or 3.5 inches by 3.5 inches.

The figurine 505 can sit on the top of the post 570, such that the top of the post 570 is inserted through the opening 580 into at least a portion of the figurine body 510. The second mounting pad 530 can rest against the side of the post 570. In one embodiment, the post 570 can be inserted into the figurine body 510 until the figurine body 510 rests on the top of the post 570.

The figurine 505 can be attached to the post 570 using fasteners. For example, one or more fasteners 590 can be placed through the fastening area 560 (on both sides) into the post 570. The fasteners 590 can be screws, rivets, or any other fastener. Alternatively, the figurine 505 can be attached to the post 570 using adhesive.

Advantageously, the figurine 505 can be easily configured to adapt to multiple mounting situations. Advantageously, the first mounting pad 520 can be separated from the figurine body 510 by cutting through a guide groove, so that the post 570 can be inserted into figurine 505. Advantageously, the fastening area 560 can be used to mount the figurine 505 to an object.

Figure 6:
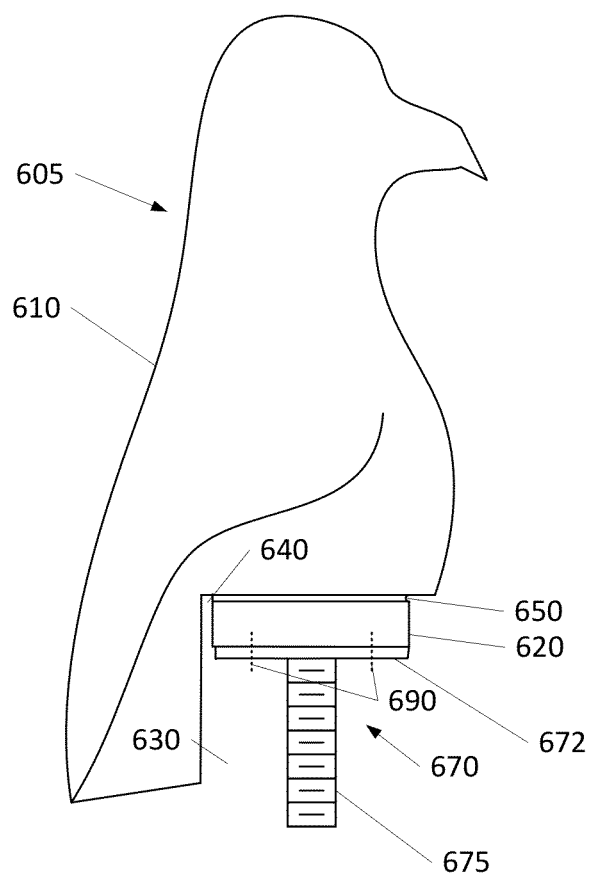
FIG. 6 is a side view of a figurine mounted on an adapter in accordance with an illustrative embodiment.

Referring to FIG. 6, a side view of a figurine 605 mounted on an adapter 670 in accordance with an illustrative embodiment is shown. As described above, the figurine 605 can include a figurine body 610, a first mounting pad 620, a second mounting pad 630, a notch 640, a guide groove 650, and a fastening area 660. The first mounting pad 620 remains attached to the figurine body 610. The adapter 670 can be attached to the bottom of the second mounting pad 630 so that the figurine 605 mounted on the adapter 670 can be mounted on other objects. For example, the adapter 670 can be used to mount the figurine 605 on a fence rail or beam.

The adapter 670 can include a plate 672 and a threaded stud 675. In one embodiment, the threaded stud 675 can be welded to or pressed into the plate 672. The plate 672 can include, for example, four holes near the corners for securing the adapter 670 to the figurine 605. The adapter 670 can be configured such that the threaded stud 675 can be used to secure the figurine 605 to an object through a hole. For example, the threaded stud 675 can be inserted through a hole drilled through a fence rail and secured using a washer and nut.

The plate 672 of the adapter 670 can be attached to the figurine 605 using fasteners 690. For example, one or more fasteners 690 can be placed through the plate 672 of the adapter 670 into the first mounting pad 620. The fasteners 690 can be screws, rivets, or any other fastener. Alternatively, the figurine 605 can be attached to the adapter 670 using adhesive.

Advantageously, the figurine 605 can be easily configured to adapt to multiple mounting situations. Advantageously, the first mounting pad 620 can be used to mount the figurine 605 to an object using an adapter 670.

Figure 7A:
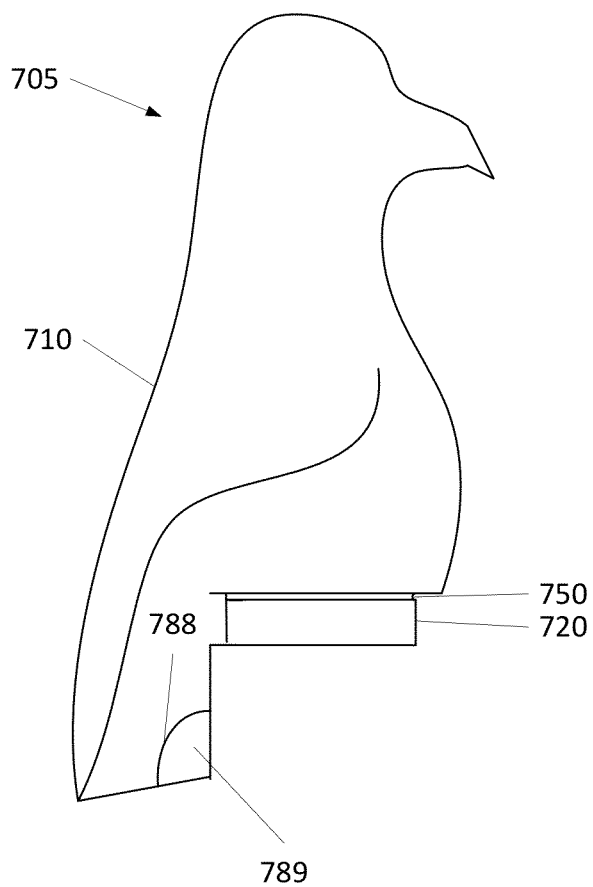
FIG. 7a is a side view of a figurine with a handle groove in accordance with an illustrative embodiment.

Referring to FIG. 7a, a side view of a figurine 705 with a handle groove 788 in accordance with an illustrative embodiment is shown. As described above, the figurine 705 can include a figurine body 710, a first mounting pad 720, and a first guide groove 750. In an illustrative embodiment, figurine 705 can also include a second guide groove 788. Similar to the first guide groove 750, a removable section 789 of the figurine body 710 can be separated from the body 710 along the second guide groove 788. The second guide groove 788 can be configured such that a person can easily remove the removable section 789 of figurine 705 outlined by the second guide groove 788. The second guide groove 788 can be a shallow groove around at least part of the figurine body. The second guide groove 788 can be thinner in depth than surrounding areas of the figurine body 710. Hence, starting at a front (or bottom) of the removable section 789, an individual can cut through the second guide groove 788 until the individual reaches the bottom (or front) of removable section 789, thereby separating the removable section 789 from the figurine body 710. In addition, the second guide groove 788 can provide a track for the person to cut through, thereby improving the accuracy of the cut. Alternatively, the second guide groove 788 can allow the removable section 789 to break away and be removed by hand without the use of a saw, utility knife, or other tool.

Figure 7B:
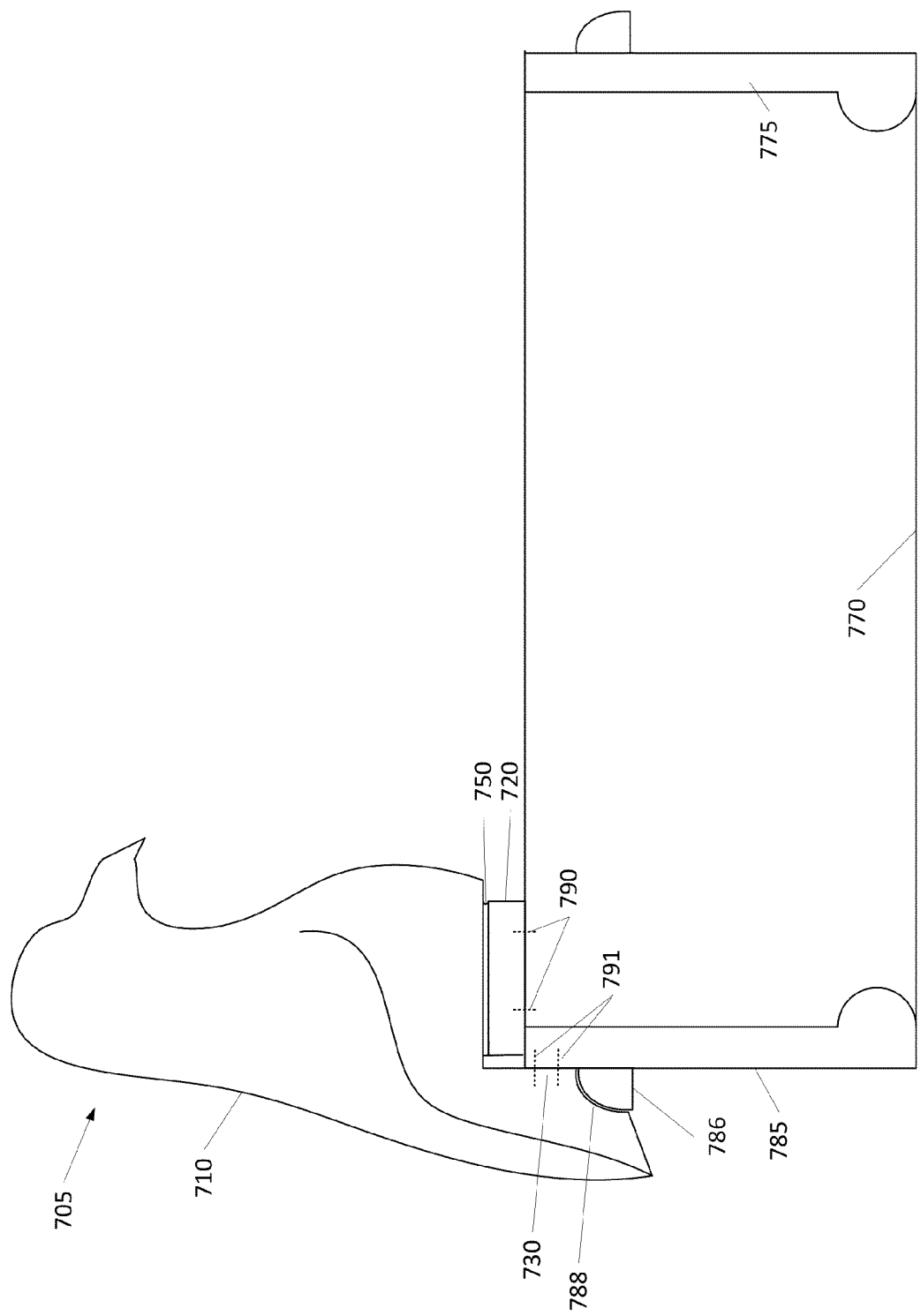
FIG. 7b is a side view of a figurine mounted on a mailbox with a rear door in accordance with an illustrative embodiment.

Referring to FIG. 7b, a side view of a figurine 705 mounted on a mailbox 770 with a rear door 785 in accordance with an illustrative embodiment is shown. As described above, the figurine 705 can include a figurine body 710, a first mounting pad 720, a second mounting pad 730, a first guide groove 750, and fasteners 790 and 791. In FIG. 7b, the mounting pad 720 remains attached to the figurine body 710. The figurine 705 can sit on the top of the mailbox 770, such that the first mounting pad 720 is located on the top of the back of the mailbox 770.

The mailbox 770 can be a mailbox with an arched top or a substantially flat top. The mailbox 770 can include a front door 775 and a rear door 785. The rear door 785 can include a rear handle 786. As described above, figurine 710 can include a second guide groove 788. In FIG. 7b, the removable section 789 has been removed from the figurine body 710. The second guide groove 788 can further be configured to allow the second mounting pad 730 to rest against the rear door 785 (i.e., the rear door handle 786 occupies at least a portion of the space created by removing the removable section 789 (not shown) of the figurine 705 outlined by second guide groove 788). The second guide groove 788 can be further configured such that the figurine body 710 is supported at least in part by the rear door 785 resting along the second guide groove 788. In another embodiment, the removable section 789 (not shown) of figurine 705 outlined by the second guide groove 788 may include at least a portion of the second mounting pad 730 such that the second mounting pad 730 is at least partially removed from the figurine body 710. In an alternative embodiment, the second guide groove 788 may be large enough to allow the rear door 785 to operate if the removable section 789 (not shown) of figurine 705 is removed (i.e., swing down without interference from figurine 705).

Figure 8:
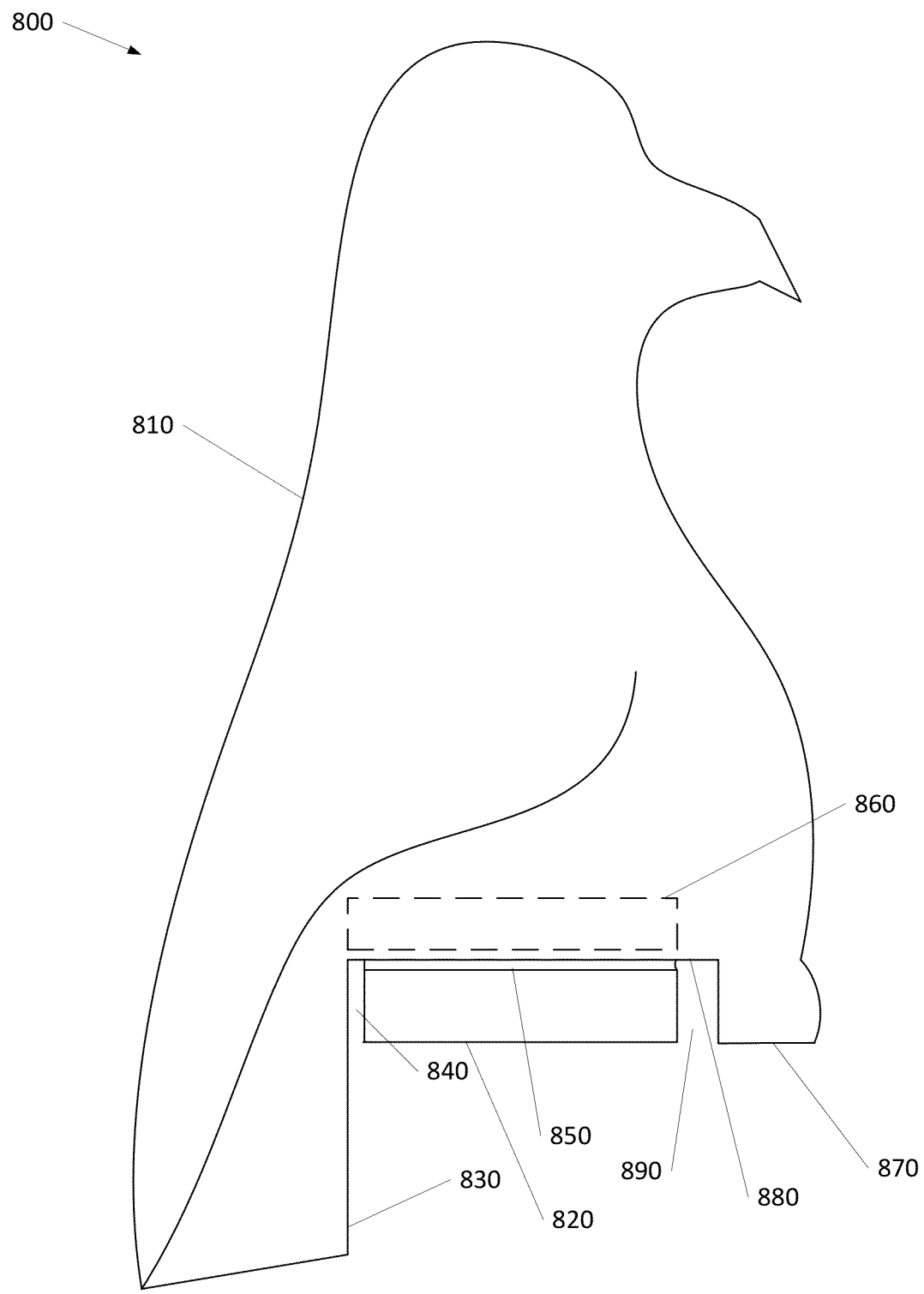
FIG. 8 is a side view of a figurine with a raised portion in the base in accordance with an illustrative embodiment.

Referring to FIG. 8, a side view of a figurine 800 with a raised portion 880 in the base is shown in accordance with an illustrative embodiment. As described above, the figurine 800 can include a figurine body 810, a first mounting pad 820, a second mounting pad 830, a notch 840, a guide groove 850, and a fastening area 860. In FIG. 8, the first mounting pad 820 remains attached to the figurine body 810. The figurine 800 can sit on the top of a structure such as a mailbox, such that the first mounting pad 820 is located on the top of the back of the mailbox and the second mounting pad 830 is located against the back of the mailbox.

The figurine 800 also includes a third mounting pad 870. In one embodiment, the third mounting pad 870 can be a rectangular box shape. The third mounting pad 870 can be a mounting mechanism. The third mounting pad 870 can be hollow. The inside base dimensions of the hollow of the third mounting pad 870 are smaller than the hollow of the first mounting pad 820. The inside base dimensions can be other dimensions in other embodiments. In one embodiment, the bottom of the third mounting pad 870 can be configured to attach to a flat surface. In one embodiment, the third mounting pad 870 can be used to secure the figurine 800 to an object, such as a mailbox.

The third mounting pad 870 is separated from the first mounting pad 820 by a space 890. In this embodiment, the space 890 extends the entire width of the figurine 800. Thus, there is no material visible in the space 890 in the side view shown in FIG. 8. In other embodiments, the space 890 may not extend the entire width of the figurine 800. In this embodiment, the side view of the space 890 is rectangular. In other embodiments, the space 890 may be any various shape that extends into the figurine 800.

The space 890 causes there to be a raised portion 880 in between the first mounting pad 820 and the third mounting pad 870. Advantageously, the raised portion 880 can add structural stability to the figurine 800. The added structural stability may prevent torsion or flexibility of the figurine 800. The structural stability may also make the figurine more durable. In this embodiment, the raised portion is at least in part adjacent to both the first mounting pad 820 and the third mounting pad 870. If the figurine 800 is attached to a structure or container, the first mounting pad 820, the second mounting pad 830, and/or the third mounting pad 870 may be used as a mounting mechanism. In some embodiments, a fastener may be used to attach the figurine 800 to the structure or container. Advantageously, if a fastener is used at the first mounting pad 820 or the third mounting pad 870, parts of the fastener may be in close proximity to or come into contact with the raised portion 880 (as will be discussed below). In some embodiments, if certain fasteners are used (e.g., a toggle bolt), part of the fastener may come into contact with the raised portion 880 and assist in attaching the figurine 800 to a container or structure such as a mailbox. For example, with the toggle bolt, a wings portion of the toggle bolt may be inserted from the inside of a mailbox and up into the figurine 800 through a hole in the figurine 800. A bolt portion of the toggle bolt may then be turned to tighten the toggle bolt and secure the figurine to the mailbox. This method of attaching the figurine to the mailbox can be accomplished without an installer having access to the inside of the figurine but for inserting the toggle bolt through a hole in the first mounting pad 820, the second mounting pad 830, and/or the third mounting pad 870. Advantageously, if a toggle bolt is used in the first mounting pad 820 or the third mounting pad 870 in close proximity to the raised portion 880, the wings portion of the toggle bolt will come into contact with the raised portion 880 and prevent the wings portion from spinning repeatedly while the bolt is being tightened. For example, the raised portion 880 may prevent the wings portion of the toggle bolt from rotating 360 degrees. In other embodiments, the raised portion 880 may be variously shaped or located to prevent the wings portion from rotating more than other amounts. The other amounts may be any amount, but some examples may be 320 degrees, 300 degrees, 270 degrees, 225 degrees, 200 degrees, 180 degrees, 135 degrees, 90 degrees, etc. Regardless of the amount the raised portion 880 is designed to prevent the fastener from rotating, one purpose of the raised portion 880 is to offer support to the fastener and assist in securing the figurine 800 to a structure. In other words, the raised portion 880 is configured to offer support to the fastener and make it easier to attach the figurine 800 to a structure. This configuration may allow a fastener such as a toggle bolt to be attached more securely than if the raised portion 880 was not present.

In an alternative embodiment, the raised portion 880 may be variously located and shaped. For example, a raised portion 880 may exist solely in the second mounting pad 830 and would be at least in part adjacent to the second mounting pad 830. In another example, the raised portion 880 may be located in such a way as to create a space and a fourth mounting pad near the second mounting pad 830. In another embodiment, the raised portion 880 may exist solely in the first mounting pad 820 and would be at least in part adjacent to the first mounting pad 820. In such an embodiment, the third mounting pad 870 may not be present. In a further embodiment, the raised portion 880 may exist solely in the third mounting pad 870 and would be at least in part adjacent to the third mounting pad 870.

In other alternative embodiments, the raised portion 880 may be present in association with the space 890. In varying embodiments of shape or location of the raised portion 880, the space 890 may also have varying shapes and locations. In another embodiment, the raised portion 880 may be accomplished without a space 890. For example, the raised portion 880 may be a piece of solid material that is located in the hollow of the figurine 800 at or adjacent to one or more of the first mounting pad 820, the second mounting pad 830, and the third mounting pad 870.

Figure 9:
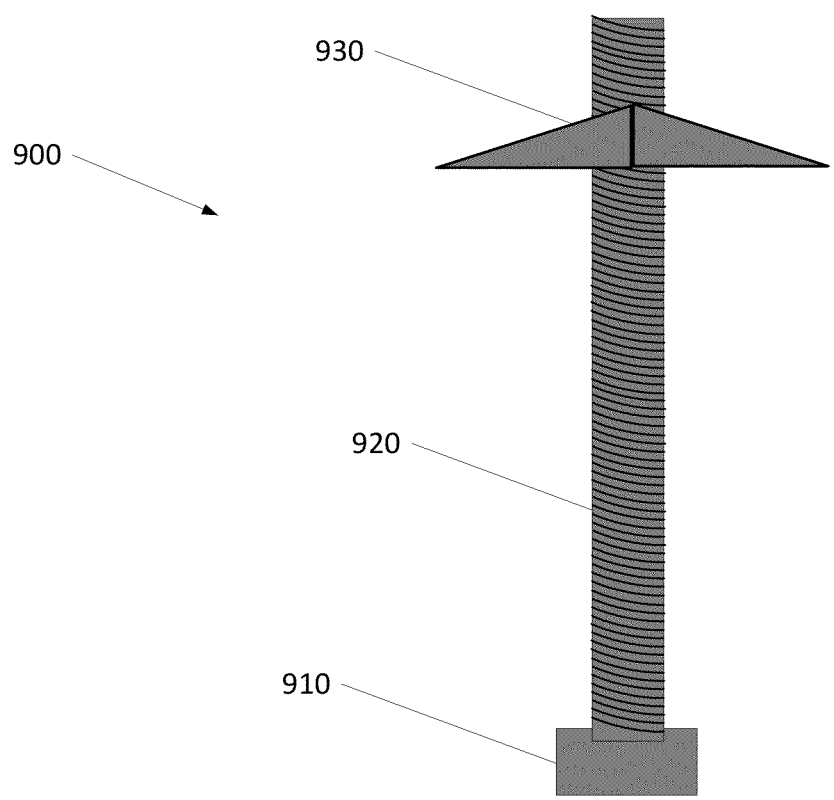
FIG. 9 is a view of a toggle bolt in accordance with an illustrative embodiment.

Referring to FIG. 9, a view of a toggle bolt 900 is shown in accordance with an illustrative embodiment. The toggle bolt 900 includes a bolt portion that has a head portion 910 and a thread portion 920. The toggle bolt 900 also includes a wings portion 930. The wings portion 930 can be configured to rotate around the thread portion 920. The wings portion 930 can further be configured so that if the wings portion 930 is rotated a particular direction (e.g., clockwise), the wings portion 930 will move along the thread portion 920 toward the head portion 910 of the toggle bolt 910. The wings portion 930 can be further configured so that if the wings portion 930 is rotated a second direction (e.g., counterclockwise), the wings portion 930 will move along the thread portion 920 away from the head portion 910 of the toggle bolt 910.

The wings portion 930 of the toggle bolt 900 can be further configured to fold such that the diameter of the wings portion is only slightly greater than that of the thread portion 920 of the toggle bolt 900 and smaller than the diameter of the head portion 910 of the toggle bolt 900. This allows the wings portion 930 of the toggle bolt 900 to be inserted into a hole, even when there is not access to the other side of the hole. The wings portion 930 is also spring loaded such that when pressure is applied to the wings portion 930, the wings portion 930 folds. However, when there is no longer a force applied to the wings portion 930, the wings portion 930 returns to the wider configuration as shown in FIG. 9. In this way, the wings portion 930 can be inserted into a hole smaller than the diameter of the head portion 910 of the toggle bolt 910. After being inserted, the wings portion 930 can return to the position shown in FIG. 9, which allows the head portion 910 to be turned to tighten the toggle bolt 900.

Figure 10:
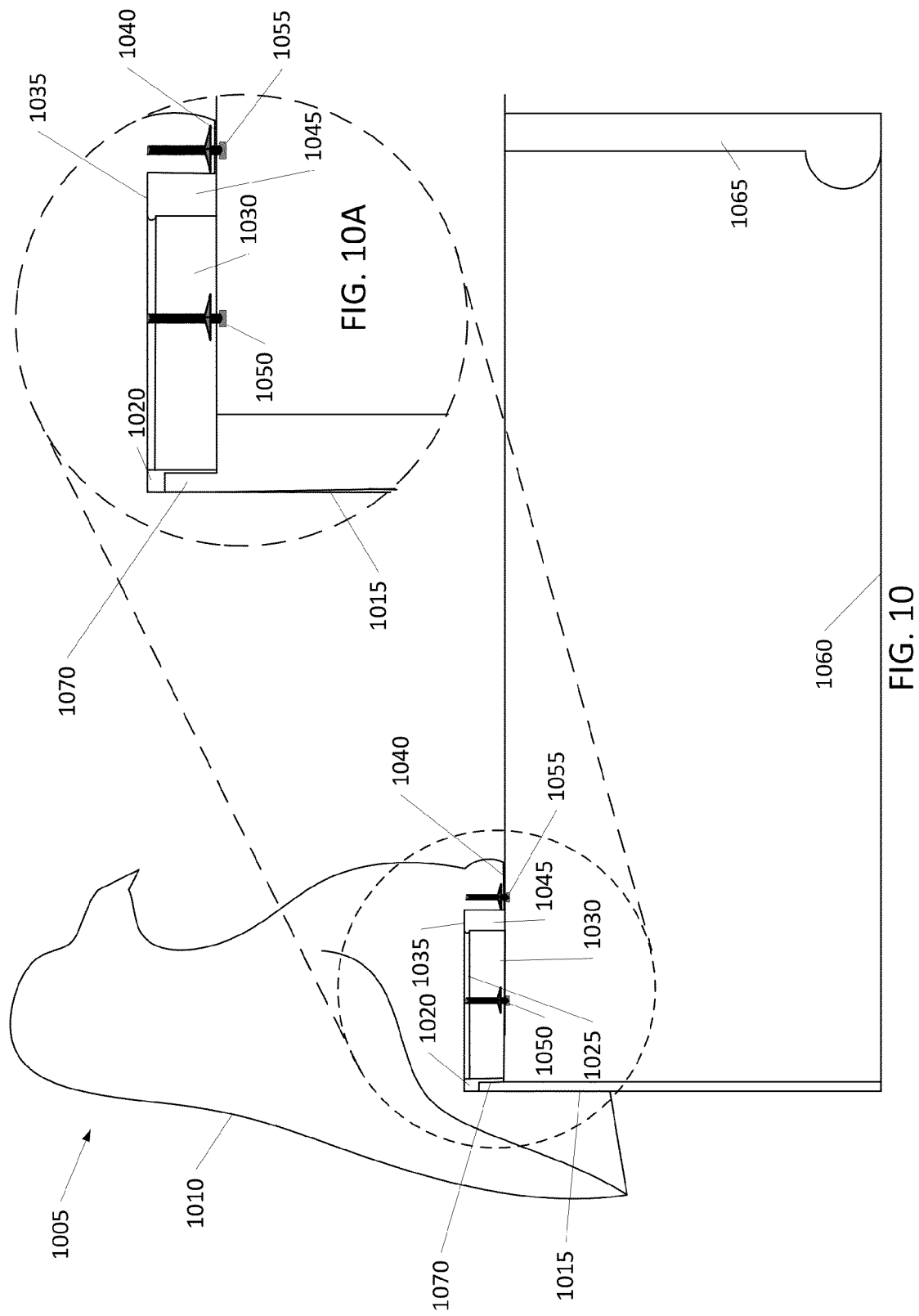
FIG. 10 is a side view of a figurine with a raised portion in the base mounted on a mailbox in accordance with an illustrative embodiment.

Referring to FIG. 10, a side view of a figurine 1005 with a raised portion 1035 in the base mounted on a mailbox 1060 is shown in accordance with an illustrative embodiment. FIG. 10A shows a detailed view of the mating area between the figurine 1005 with a raised portion 1035 in the base and the mailbox 1060 in accordance with an illustrative embodiment, using the same element numbers. As described above, the figurine 1005 can include a figurine body 1010, a first mounting pad 1030, a second mounting pad 1015, a third mounting pad 1040, a notch 1020, a guide groove 1025, a space 1045, and a raised portion 1035. In FIG. 10, the first mounting pad 1030 remains attached to the figurine body 1010. The figurine 1005 can sit on the top of a mailbox 1060, such that the first mounting pad 1030 and the third mounting pad 1040 are located on the top of the back of the mailbox 1060 and the second mounting pad 1015 is located against the back of the mailbox 1060.

The mailbox 1060 can be a standard mailbox with an arched top. The mailbox 1060 can include a door 1065 and a lip 1070. The lip 1070 can be the seam where the top of the mailbox 1060 and the back of the mailbox are connected together. For example, in a steel mailbox, a seaming machine will roll and press the top and back of the mailbox together. The lip 1070 can extend beyond the body of the mailbox 1060. Alternatively, the lip 1070 can be an aesthetic detail added to the mailbox 1060.

The notch 1020 can be configured to receive the lip 1070 to sit in so that the first mounting pad 1030 and the third mounting pad 1040 can sit flush on the top of the mailbox 1060. Thus, in one embodiment, the notch 1020 is shaped large enough to allow for the top portion of the lip 1070. Further, the notch 1020 can enable the second mounting pad 1015 to contact the back of the mailbox 1060.

The figurine 1005 can be attached to the mailbox 1060 using fasteners. For example, fasteners 1050 and 1055 can be placed through the inside of the mailbox 1060 into the first mounting pad 1030 and the third mounting pad 1040. In an alternative embodiment, one or more fasteners may be placed through the inside of the mailbox 1060 into the second mounting pad 1015. The fasteners 1050 and 1055 can be screws, rivets, or any other fastener. In this embodiment, the fasteners 1050 and 1055 are toggle bolts such as the one described above with respect to FIG. 9. Alternatively, the figurine 1005 can be attached to the mailbox 1060 using adhesive.

Advantageously, the figurine 1005 can be easily configured to adapt to multiple mounting situations. Advantageously, the first mounting pad 1030, the second mounting pad 1015, and the third mounting pad 1040 can be used to mount the figurine 1005 to the mailbox 1060.

In the embodiment in FIG. 10 and FIG. 10A, toggle bolts as shown in FIG. 9 are used as fasteners 1050 and 1055. In this embodiment, the wings portion of fastener 1055 comes into contact with the raised portion 1035 of the figurine 1005. As a result, the wings portion of the fastener 1055 cannot rotate in a particular direction once the wings portion comes into contact with the raised portion 1035. This allows the fastener 1055 to be tightened without the wings portion of the fastener 1055 spinning and preventing the fastener from being completely tightened. The wings portion and at least part of the thread portion of the fasteners 1050 and 1055 are inside the figurine 1005. The head portion of the fasteners 1050 and 1055 are located inside the mailbox 1060.

In other embodiments, the fastener 1050 may also come into contact with the raised portion 1035 or a different raised portion. Other embodiments may also have varying numbers of fasteners for attaching the figurine 1005 to the mailbox 1060. For example, in one embodiment multiple fasteners may be used in the same mounting pad, as discussed below with respect to FIG. 11.

Figure 11:
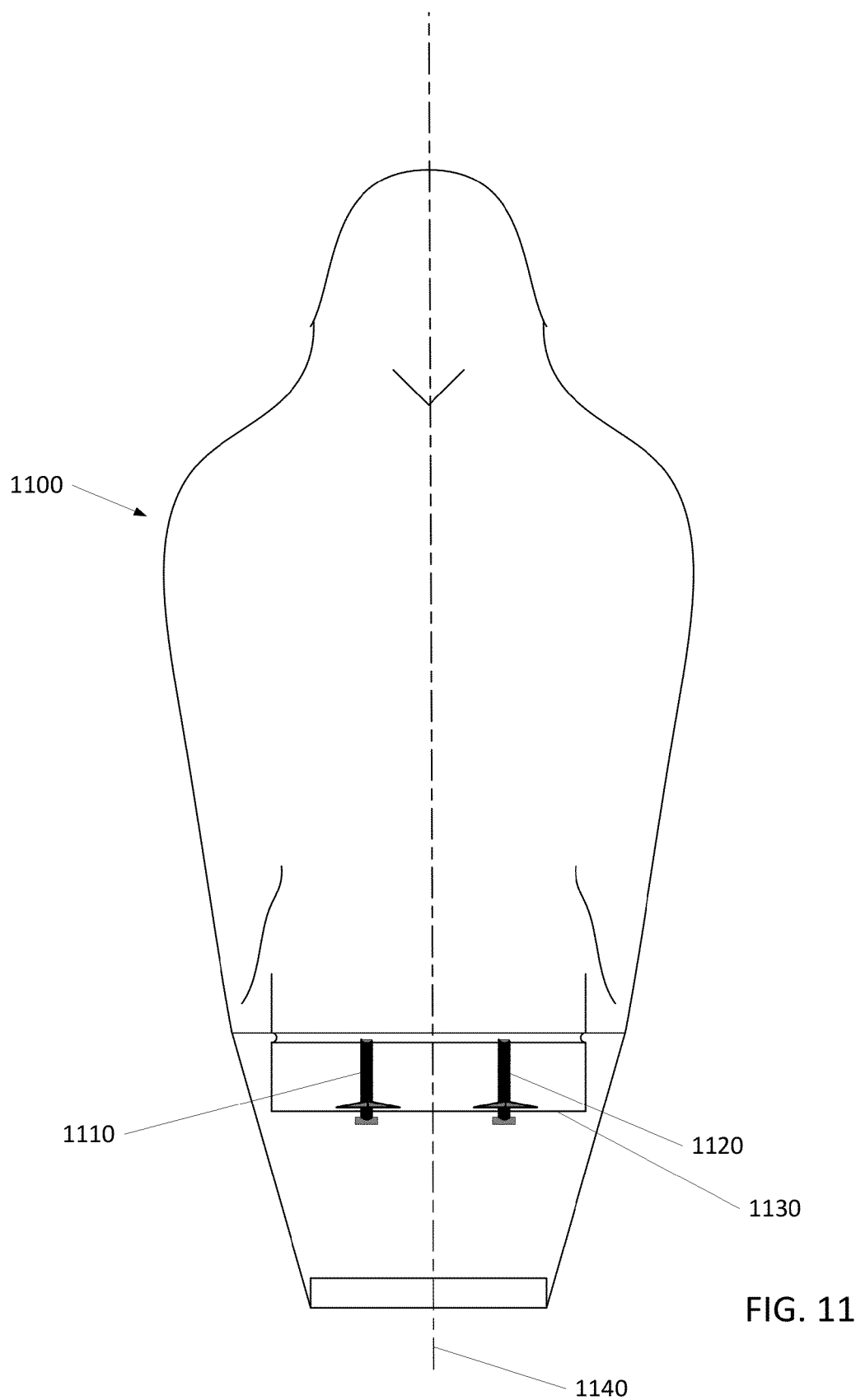
FIG. 11 is a front view of a figurine with multiple fasteners used in the same mounting pad in accordance with an illustrative embodiment.

Referring to FIG. 11, a front view of a figurine 1100 with multiple fasteners 1110 and 1120 used in the same mounting pad 1130 is shown in accordance with an illustrative embodiment. In this embodiment, the figurine 1100 may be attached to a mailbox or other structure or container (not pictured). Here, the fasteners 1110 and 1120 are toggle bolts such as the one described above with respect to FIG. 9. In this embodiment, the fasteners 1110 and 1120 are on opposite sides of a centerline 1140 of the figurine 1100. Advantageously, when attaching the figurine 1100 to a mailbox or other structure or container, the fasteners 1110 and 1120 can be tightened in such a manner that the figurine 1100 is attached in a desirable manner. For example, it may be desirable to straighten the figurine 1100 during installation such that centerline 1140 of the figurine 1100 is orthogonal to the ground or the base of a mailbox. In other words, the orientation of the figurine 1100 may be adjusted by tightening or loosening the fasteners 1110 and 1120 as needed to achieve the desired orientation. Further, the locations of fasteners 1110 and 1120 may more securely attach the figurine 1100 to the mailbox or other structure or container.

In alternative embodiments, more or less fasteners may be used and such fasteners may be used in varying locations. For example, in addition to the fasteners shown in FIG. 11, other fasteners may be used in other mounting pad locations such as the mounting pads shown in FIG. 8.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An article of manufacture comprising:
    a figurine body;
    a first mounting pad at a bottom of the figurine body, wherein the first mounting pad comprises a first mounting mechanism; and
    a raised portion at the bottom of the figurine body,
    wherein:
        the raised portion is at least in part adjacent to the first mounting pad;
        the raised portion is raised in relation to the first mounting pad; and
        the raised portion is configured to prevent a portion of a first fastener from rotating 360 degrees.

2. The article of manufacture of claim 1, wherein the first mounting pad is configured to attach to a first surface of a structure with the first fastener.

3. The article of manufacture of claim 2, wherein the first fastener is a toggle bolt and wherein the toggle bolt comprises:
    a bolt portion; and
    a wings portion,
    wherein:
        the bolt portion comprises a head portion and a thread portion; and
        the wings portion is configured to be in a folded position or an extended position, and is further configured to screw onto the thread portion of the bolt.

4. The article of manufacture of claim 3, wherein the first mounting pad is further configured to attach to the first surface of structure by accommodating the wings portion and at least part of the thread portion of the toggle bolt inside the figurine body, and further wherein the head portion remains outside the figurine body.

5. The article of manufacture of claim 4, wherein the wings portion is the portion of the first fastener prevented from turning 360 degrees.

6. The article of manufacture of claim 5, further comprising a second mounting pad at the bottom of the figurine body, wherein the second mounting pad comprises a second mounting mechanism.

7. The article of manufacture of claim 6, wherein the raised portion is at least in part adjacent to the second mounting pad and wherein the raised portion is raised in relation to the second mounting pad.

8. The article of manufacture of claim 7, wherein the first mounting pad and the second mounting pad are located on opposite sides of the raised portion.

9. The article of manufacture of claim 8, wherein the second mounting pad is configured to attach to the first surface of the structure with a second fastener.

10. The article of manufacture of claim 9, further comprising a third mounting pad on the figurine body, wherein the third mounting pad is orthogonal to the bottom of the first mounting pad, and wherein the third mounting pad is configured to attach to a second surface of the structure with a third fastener.

11. The article of manufacture of claim 9, wherein the first mounting pad is further configured to attach to the first surface of the structure with a third fastener.

12. The article of manufacture of claim 11, wherein the first fastener and the third fastener are configured to adjust an orientation of the figurine body when the first mounting pad is attached to the first surface of the structure by the first fastener and the third fastener.

13. The article of manufacture of claim 12, wherein the orientation of the figurine body is adjusted when one of the first fastener or the third fastener is loosened or tightened.

14. The article of manufacture of claim 9, wherein the figurine body and the second mounting pad are separated by a guide groove, and wherein upon removal of the second mounting pad from the figurine body at the guide groove, an opening is exposed to form a third mounting mechanism.

15. The article of manufacture of claim 14, wherein the opening has a cross-section configured to receive a post.

16. The article of manufacture of claim 15, further comprising a fastening area located on a side of the figurine body, wherein the fastening area is configured to lie against the post, wherein the post is inserted into the figurine body.

17. The article of manufacture of claim 9, wherein the second mounting pad comprises a notch located in a bottom of the second mounting pad.

18. The article of manufacture of claim 17, wherein the notch is configured to fit over a lip of a mailbox, wherein the mailbox is the structure.

19. An assembly comprising:
   a mailbox; and
   a figurine mounted to the mailbox, wherein the figurine comprises:
      a figurine body;
      a first mounting pad at a bottom of the figurine body, wherein the first mounting pad comprises a first mounting mechanism; and
      a raised portion at the bottom of the figurine body, wherein:
         the raised portion is at least in part adjacent to the first mounting pad;
         the raised portion is raised in relation to the first mounting pad; and
         the raised portion is configured to prevent a portion of a first fastener from rotating 360 degrees.

20. A method comprising:
forming a figurine body; and
forming a first mounting pad on the figurine body, wherein the first mounting pad comprises a first mounting mechanism; and
forming a raised portion at a bottom of the figurine body, wherein:
   the raised portion is at least in part adjacent to the first mounting pad;
   the raised portion is raised in relation to the first mounting pad; and
   the raised portion is configured to prevent a portion of a first fastener from rotating 360 degrees.

* * * * *